United States Patent [19]

Schlafly

[11] Patent Number: 5,373,560

[45] Date of Patent: Dec. 13, 1994

[54] PARTIAL MODULAR REDUCTION METHOD

[76] Inventor: Roger Schlafly, P.O. Box 1680, Soquel, Calif. 95073

[21] Appl. No.: 102,478

[22] Filed: Aug. 4, 1993

Related U.S. Application Data

[63] Continuation-in-part of Ser. No. 804,850, Dec. 6, 1991, Pat. No. 5,274,707.

[51] Int. Cl.$^5$ .............................................. H04K 1/00
[52] U.S. Cl. ........................................ 380/30; 380/28
[58] Field of Search ...................... 380/23, 28, 30, 49, 380/50; 364/753, 754, 758, 759

[56] References Cited

U.S. PATENT DOCUMENTS

| | | | |
|---|---|---|---|
| 4,405,829 | 9/1983 | Rivest et al. | 380/30 |
| 5,231,668 | 7/1993 | Kravitz | 380/28 |
| 5,253,195 | 10/1993 | Broker et al. | 364/759 |
| 5,271,061 | 12/1993 | Crandall | 380/28 |
| 5,272,755 | 12/1993 | Miyaji et al. | 380/30 |
| 5,274,707 | 12/1993 | Schlafly | 380/30 |

OTHER PUBLICATIONS

Bosselaers, Antoon et al; "Comparision of three Modullar Reduction Functions", Third Annual CRYPTO Conference, Univ. of California, Santa Barbara; Aug. 22, 1993; pp. 17.1–17.11.

*Primary Examiner*—Tod R. Swann

[57] ABSTRACT

A method is given for the modular reduction of cryptographic variables, a component of many public key cryptosystems. It involves calculating a partial inverse to the modulus, partially multiplying cryptovariables, and using estimates which depend on properties of the modulus, If the estimates fail, a spill word is used. A method for choosing a modulus to get cryptographic security and maximal efficiency in modular reduction is also given.

48 Claims, 11 Drawing Sheets

```
p = A2F7 A40D 520C 7CB3 (modulus)
I(p) = 0001 9224 5423 BF03 98FA.0735 (inverse)

p I(p) = FFFF FFFF FFFF FFFF FFFF FFFF A4A6 39E5 FC9A.E81C
T(I(p)) = 5B59 C61A 0365 17E4 x = 8595 427C 9630 16C5
x² = 45B4 6E1B EA59 45B5 D5C2 068F 67E6 7399 x² I(p)
full multiply:

(x²)          45B4 6E1B EA59 45B5 D5C2 068F 67E6 7399
             (inverse)      x      0001 9224 5423 BF03 98FA.0735
                         ----------------------------------------------
                             01F6 5D5D 8F2F F563 677D 8F59 4787 CFDF 1DAD
                        29A7 3394 1A67 DC92 0A7D F35F 8DBC 4BAF BB6A
                   3402 6F44 1E2C 5A0E 7B9D 442B 1233 27F2 81CB
              16E8 BBCC 36B6 5514 31FF E3AD F3B2 D270 01EB
         27CA B42B 6793 DE4F 817A B706 B56C 0A55 8384
    0000 45B4 6E1B EA59 45B5 D5C2 068F 67E6 7399
    --------------------------------------------------------------------
    0000 6D7F 3930 41BB F3A7 0007 C169 E85F B5AD C304 46F3 1502 8B49 1DAD quotient = 6D7F 3930 41BB F3A7

6D7F 3930 41BB F3A7 (quotient)
                     x  A2F7 A40D 520C 7CB3 (modulus)
                     ------------------------
                        3556 2FA8 5C95 0070 41C5
                   2317 E248 2351 48DA E9D4
              462B 1018 D18F BEA2 5B7B
         45B4 27F0 B728 5C87 C421
         -----------------------------------
         45B4 6E1B EA59 45B5 D5BD 00EA EA44 41C5

45B4 6E1B EA59 45B5 D5C2 068F 67E6 7399  (x²)
       - 45B4 6E1B EA59 45B5 D5BD 00EA EA44 41C5
         ------------------------------------------
                             0005 05A4 7DA2 31D4 residue = 0005 05A4 7DA2 31D4
```

Figure 1 (prior art)

p = A2F7 A40D 520C 7CB3 (modulus)
I(p) = 0001 9224 5423 BF03 98FA.0735 (inverse)

x = 8595 427C 9630 16C5
x² = 45B4 6E1B EA59 45B5 D5C2 068F 67E6 7399 x² I(p)
partial multiply:

```
            45B4 6E1B EA59 45B5 D5C2 068F 67E6 7399  (x²)
          x 0001 9224 5423 BF03 98FA.0735            (inverse)
          ---------------------------------------
                                        01F6 5A44
                                   29A7 3393 8E5E
                              3402 6F44 1E2C 260B
                         16E8 BBCC 36B6 5513 EBBF
                    27CA B42B 6793 DE4F 817A B348
               0000 45B4 6E1B EA59 45B5 D5C2 068F
          ---------------------------------------
               0000 6D7F 3930 41BB F3A7 0006 B443
``` quotient = 6D7F 3930 41BB F3A7

```
               6D7F 3930 41BB F3A7  (quotient)
             x A2F7 A40D 520C 7CB3  (modulus)
          ------------------------
          3556 2FA8 5C95 0070 41C5
          1254 2351 48DA E9D4
          2A1F BEA2 5B7B
          9B1A C421
          ------------------------
          0001 0CE4 D5BD 00EA EA44 41C5
```

```
     45B4 6E1B EA59 45B5 D5C2 068F 67E6 7399  (x²)
   -           D5BD 00EA EA44 41C5
   ------------------------------------------
                    0005 05A4 7DA2 31D4        (residue)
``` residue = 0005 05A4 7DA2 31D4

Figure 2

```
p = A2F7 A40D 520C 7CB3  (modulus)
I(p) = 0001 9224 5423 BF03 98FA  (inverse)

x = 8595 427C 9630 16C5
x² = 45B4 6E1B EA59 45B5 D5C2 068F 67E6 7399 x² I(p)
          45B4 6E1B EA59 45B5 D5C2 068F 67E6 7399  (x²)
        x 0001 9224 5423 BF03 98FA                  (inverse)
        ---------------------------------------------
                              29A7 3393 8E5E
                         3402 6F44 1E2C 260B
                    16E8 BBCC 36B6 5513 EBBF
               27CA B42B 6793 DE4F 817A B348
          45B4 6E1B EA59 45B5 D5C2 068F
        ---------------------------------------------
               6D7F 3930 41BB F3A6 FE10 59FF A2F7 A40D 520C 7CB3  (modulus)
                  x 6D7F 3930 41BB F3A6  (quotient)
                  ---------------------------
                    3556 2FA8 5C95 006F C512
                    1254 2351 48DA 97C8
                    2A1F BEA1 B76E
                    9B1A 212A
                  ---------------------------
                    0001 0CE4 32C5 5CDD 9837 C512

45B4 6E1B EA59 45B5 D5C2 068F 67E6 7399  (x²)
        -                    32C5 5CDD 9837 C512
        ---------------------------------------------
                                A2FC A9B1 CFAE AE87  (residue)

residue = A2FC A9B1 CFAE AE87
```

Figure 3 p = FFFC CA61 4E63 6A37 (modulus)
inv:  0001 0003 35A8 FEB0 E6F3 (inverse)

x = FFFC CA61 4C98 CACF
$x^2$:  FFF9 94CC E624 E2B3 EC4B 707A 5E7B 5361

```
        FFF9 94CC E624 E2B3 EC4B 707A 5E7B 5361  (x²)
     x       0001 0003 35A8 FEB0 E6F3            (inverse)
     ---------------------------------------------
                            E6ED 3597 85A4
                       FEA9 9D39 9935 F0C0
                  35A6 A798 121C AB23 D478
             0002 FFEC BE66 B26E A81B C4E1
        0000 FFF9 94CC E624 E2B3 EC4B 707A
     ---------------------------------------------
        0000 FFFC CA61 4ACE 2B66 0E58 8037
```

```
              FFFC CA61 4ACE 2B66  (quotient)
          x   FFFC CA61 4E63 6A37  (modulus)
          -----------------------------
                   6A35 AB1B C3E0 7043 8EEA
              4E62 046B E86A BEF3 DC72
              9FFD 73E4 065C EDA6
              4ACD 002D 5268
          -----------------------------
          0001 392C E2B2 EC4B 707A 4CB5 8EEA
```

```
        FFF9 94CC E624 E2B3 EC4B 707A 5E7B 5361  (x²)
           -         E2B2 EC4B 707A 4CB5 8EEA
        ---------------------------------------
                    0001 0000 0000 11C5 C477  (1st residue)

0001 0000 0000 11C5 C477  (1st residue)
                         FFFC CA61 4E63 6A37  (modulus)
                    ---------------------------
                         0003 359E C362 5A40  (residue)
```

Figure 4

```
p = FFFC CA61 4E63 6A37  (modulus)
inv:  0001 0003 35A8 FEB0 E6F3.F1AE  (inverse)

x = FFFC CA61 4C98 CACF
x²:   FFF9 94CC E624 E2B3 EC4B 707A 5E7B 5361

FFF9 94CC E624 E2B3 EC4B 707A 5E7B 5361  (x²)
         x  0001 0003 35A8 FEB0 E6F3.F1AE            (inverse)
         ---------------------------------------
                                         F1A7 643E
                                    E6ED 3597 85A4
                               FEA9 9D39 9935 F0C0
                          35A6 A798 121C AB23 D478
                       0002 FFEC BE66 B26E A81B C4E1
                  0000 FFF9 94CC E624 E2B3 EC4B 707A
                  ---------------------------------------
                  0000 FFFC CA61 4ACE 2B66 FFFF E475

FFFC CA61 4ACE 2B66  (quotient)
                    x  FFFC CA61 4E63 6A37  (modulus)
                       ---------------------
                        6A35 AB1B C3E0 7043 8EEA
                   4E62 046B E86A BEF3 DC72
              9FFD 73E4 065C EDA6
              4ACD 002D 5268
              ---------------------
              0001 392C E2B2 EC4B 707A 4CB5 8EEA FFF9 94CC E624 E2B3 EC4B 707A 5E7B 5361  (x²)
                -    E2B2 EC4B 707A 4CB5 8EEA
         ---------------------------------------
                       0001 0000 0000 11C5 C477  (1st residue)

0001 0000 0000 11C5 C477  (1st residue)
                            FFFC CA61 4E63 6A37  (modulus)
                       ---------------------
                            0003 359E C362 5A40  (residue)
```

Figure 5

```
Prime modulus:
98A3DF52 AEAE9799 325CB258 D767EBD1 F4630E9B 9E21732A 4AFB1624 BA6DF911
466AD8DA 960586F4 A0D5E3C3 6AF09966 0BDDC157 7E54A9F4 02334433 ACB14BCB Inverse:
00000001 AD59892B C86626C7 67E23EE2 ABE49721 F857447D 5E69296F 60DAB0A6
EC855878 553AC9CC 0BC4047E EE1F5A78 9C5983EE 832303A0 F9901780 073B96E5
3821F8FA 15F67D31
```

```
      00000001.00000000    (v, minimum value)
              .      40    (v, maximum error from partial multiply)
              .15F67D31    (u, last word of inverse)
      +       .       2    (u, bound on error from last word)
      ------------------
      00000001.15F67D73    (u + v)

00000001.15F67D73  x  00000001.15F67D73

=  00000001.2DCF58D0 347D81A9

00000001.2DCF58D0 347D81A9  x  .98A3DF53

=  .B3F44F0A A4531A20 3F3E40CB  <  1
```

```
16-bit word inverse:
0001AD59 892BC866 26C767E2 3EE2ABE4 9721F857 447D5E69 296F60DA B0A6EC85
5878553A C9CC0BC4 047EEE1F 5A789C59 83EE8323 03A0F990 1780073B 96E53821
F8FA15F6

Order of subgroup:
BB5DFE42 DE115C00 DB5EF1B0 388344D6 C15485AD

Generator:
5D9E9D4C 6EF57E63 67659293 45D2FA1F 40D84922 37BA8BDA 1E3A3FBC 6FCB118F
991EA62B 256BAB43 8BE5F2CE 979466A6 EDD266BA 1AD0B9D7 B97E5565 25A00A76
```

Figure 6

```
Prime modulus:
93E8965D AFD9DFEC FD00B466 B68F90EA 68AF5DC9 FED91527 8D1B3A13 7471E655
96C37FED 0C7829FF 8F8331F8 1A270043 8ECDCC09 447DC397 C685F397 294F722B
CC484AED F28BED25 AAAB35D3 5A65DB1F D62C9D7B A55844FE B1F9401E 67134093
3EE43C54 E4DC4594 00D7AD61 248B83A2 624835B3 1FFF2D95 95A5B90B 276E44F9

Inverse:
00000001 BB15A920 E22A889B 6349CAA0 3503BE43 652F7175 80F176DC 19A30FA4
0633151F 479DB4BE 86DCE580 7ABF6116 155D9F15 867FB6E1 A3E13A2E E6F02730
E463F1CD F93AD9D5 D861B00A 90A08AAA E9BA6969 EA1B6D5B C4244189 962AD1AD
2A4176F9 9AE91BE3 10332696 4CD190F4 1A4F6EB3 0C1755C3 A952BE02 C62D525C
DF55E7AE 28B36ADD 00000001.00000000  (v, minimum value)
                      40  (v, maximum error from partial multiply)
               .28B36ADD  (u, last word of inverse)
            +.        2   (u, bound on error from last word)
       ------------------
       00000001.28B36B1F  (u + v)

00000001.28B36B1F  x   00000001.28B36B1F

=  00000001.57DF6576 AA2CEDC1

00000001.57DF6576 AA2CEDC1  x  .93E8965E

=  .C6ADB3B2 40BCCE86 19B662DE

< 1

16-bit word inverse:
0001BB15 A920E22A 889B6349 CAA03503 BE43652F 717580F1 76DC19A3 0FA40633
151F479D B4BE86DC E5807ABF 6116155D 9F15867F B6E1A3E1 3A2EE6F0 2730E463
F1CDF93A D9D5D861 B00A90A0 8AAAE9BA 6969EA1B 6D5BC424 4189962A D1AD2A41
76F99AE9 1BE31033 26964CD1 90F41A4F 6EB30C17 55C3A952 BE02C62D 525CDF55
E7AE28B3

Order of subgroup:
BB5DFE42 DE115C00 DB5EF1B0 388344D6 C15485AD

Generator:
69279F8E BAB80E8F 24F01846 2196636C 4C225464 F0133E0F 2F21E7BB ED1D853F
06EB949A 86850A30 A9B5B2CE A830EAAD 00E7BDF6 1EBC81CC 41DEBAFF 1B5BFD9F
2AA4B113 29B13C3D C6951127 FBC86B4D 3533823B F97A58DE 2FF1F9C9 B3177BA3
494ED5E0 00383DBD 6A699D57 89548FCE F507368E 4BE66EEB 0F087573 8CBCFCC5
```

Figure 7

Seed:
D1228957 EB28279F 40CD5D9A 901A6A76 FD148B57

Prime modulus:
BB5DFE42 DE115C00 DB5EF1B0 388344D6 C15485AD

Inverse:
00000001 5DC5EC6C A915289C A81E9AE7 5BF70192 54794D71 B6A738C4

```
    00000001.00000000  (v, minimum value)
            .      40  (v, maximum error from partial multiply)
            .B6A738C4  (u, last word of inverse)
   +        .       2  (u, bound on error from last word)
   ------------------
    00000001.B6A73906  (u + v)
```

00000001.B6A73906  x  00000001.B6A73906

=  00000002.EFA0A45B FA87AC24

00000002.EFA0A45B FA87AC24  x  .BB5DFE43

=  00000002.261E4FF0 FF8964AD 0361C56C

> 1

16-bit word inverse:
00015DC5 EC6CA915 289CA81E 9AE75BF7 01925479 4D71B6A7 38C42595

```
    00000001.00000000  (v, minimum value)
            .      40  (v, maximum error from partial multiply)
            .000038C4  (u, last word of inverse)
   +        .       1  (u, bound on error from last word)
   ------------------
    00000001.00003905  (u + v)
```

00000001.00003905  x  00000001.00003905

=  00000001.0000720A 0CB33A19

00000001.0000720A 0CB33A19  x  .BB5DFE43

```
Prime modulus:
93E8965D AFD9DFEC FD00B466 B68F90EA 68AF5DC9 FED91527 8D1B3A13 7471E655
96C37FED 0C7829FF 8F8331F8 1A270043 8ECDCC09 447DC397 C685F397 294F722B
CC484AED F28BED25 AAAB35D3 5A65DB1F D62C9D7B A55844FE B1F9401E 67134093
3EE43C54 E4DC4594 00D7AD61 248B83A2 624835B3 1FFF2D95 95A5B90B 276E44F9

Phase 0:
00000001 BB140000

Phase 1:
00000001 BB14F5A0
00000001 BB155D56
00000001 BB158920
00000001 BB159B9D
00000001 BB15A36C
00000001 BB15A6B8
00000001 BB15A81C
00000001 BB15A8B2
00000001 BB15A8F2
00000001 BB15A90D
00000001 BB15A918
00000001 BB15A91D
00000001 BB15A91F
00000001 BB15A920

Phase 2:
00000001 BB15A920 E22A889A

Phase 3:
00000001 BB15A920 E22A889B 6349CAA0

00000001 BB15A920 E22A889B 6349CAA0 3503BE43 652F7175

00000001 BB15A920 E22A889B 6349CAA0 3503BE43 652F7175 80F176DC 19A30FA4
0633151F 479DB4BE

00000001 BB15A920 E22A889B 6349CAA0 3503BE43 652F7175 80F176DC 19A30FA4
0633151F 479DB4BE 86DCE580 7ABF6116 155D9F15 867FB6E1 A3E13A2E E6F02730
E463F1CD F93AD9D5

00000001 BB15A920 E22A889B 6349CAA0 3503BE43 652F7175 80F176DC 19A30FA4
0633151F 479DB4BE 86DCE580 7ABF6116 155D9F15 867FB6E1 A3E13A2E E6F02730
E463F1CD F93AD9D5 D861B00A 90A08AAA E9BA6969 EA1B6D5B C4244189 962AD1AD
2A4176F9 9AE91BE3 10332696 4CD190F4 1A4F6EB3 0C1755C3 A952BE02 C62D525C
DF55E7AE 28B36ADD
```

Figure 11

PARTIAL MODULAR REDUCTION METHOD

This is a continuation in part of pending patent Ser. No. 07/804,850, filed Dec. 6, 1991 incorporated here by reference now U.S. Pat. No. 5,274,707.

REFERENCES

1. U.S. Pat. No. 4,405,829 Cryptographic Communications System and Method, Ronald L. Rivest, A. Shamir, L. M. Adleman.
2. U.S. Pat. No. 5,159,632, Method and Apparatus for Public Key Exchange in a Cryptographic System, Richard E. Crandall.
3. U.S. Pat. No. 5,231,668, Digital Signature Algorithm, David Kravitz.
4. Pending U.S. patent Ser. No. 07/804,850, now U.S. Pat. No. 5,724,707 Modular Exponentiation and Reduction Device and Method, Roger Schlafly.

BACKGROUND

This invention relates to public key cryptosystems.

A popular type of cryptographic system is the public key cryptosystem. Such a system is characterized by a public key, and a private key which is determined by the public key but infeasible to compute. Such public key cryptosystems are used for public key messages such as secure key exchange, encryption, digital signatures, and authentications.

Examples of public key cryptosystems based on modular arithmetic are given in references 1, 2, and 3. Reference 1 is known in the art as RSA and has security based on the infeasibility of factoring large numbers. Reference 2 discloses a special case of the Elliptic Curve method, and is based on the difficulty of finding roots of points on an elliptic curve. Reference 3 is known as DSA, and is a variant of what is known in the art as ElGamal, and has security based on the infeasibility of the discrete logarithm problem.

The RSA, ElGamal, Elliptic Curve, and DSA methods all use a large integer modulus. With RSA, the modulus is a product of two primes which are secret and different for each user. The other methods are able to share one modulus among many users.

Public key cryptographic systems usually use intensive computation involving cryptovariables represented as large integers. These integers are typically hundreds of digits. The computations use modular arithmetic. A lot of computation time is usually spent doing modular reduction, that is, dividing. A small improvement in division can be valuable. Most of the cryptosystems are of modular exponential type, where the bulk of the computation involves raising an integer to some power with respect to some modulus. Methods for modular exponentials typically involve repeatedly multiplying two residues, and then doing a modular reduction on the product.

Crandall discloses a method for rapid modular reduction based on certain bits of the modulus being 1. Unfortunately, it is not known whether the discrete logarithm problem is secure for such a prime.

Some moduli are cryptographically weak. In the prior art, there are methods for producing weak moduli, but there is no simple test to determine the weakness of a given modulus. However, weak moduli are rare, and the National Institute of Standards and Technology (NIST) recommends a method for finding a prime modulus. It is regarded as a reliable way to obtain secure DSA parameters. It uses a sophisticated pseudorandom number generator, and the DSA modulus is determined by its length and the value of a 160-bit seed. The DSA uses a prime modulus of 512 bits or longer, and a generator of a multiplicative subgroup whose order is a 160-bit prime.

Prior art on large integer multipliers is disclosed in The Art of Computer Programing, Vol. 2, Seminumerical Algorithms, by Donald E. Knuth, Addison-Wesley, 1981. The classical algorithm requires execution time which is quadratic in the size of the input. Algorithms for subquadratic multipliers are also given.

Accordingly, there is a need for efficient modular reduction methods in cryptosystems. There is also a need for cryptographically strong moduli which allow particularly efficient modular reduction.

BRIEF DESCRIPTION OF THE DRAWINGS

FIG. 7 shows a 1024-bit prime modulus having the compact inverse property.

DETAILED DESCRIPTION

This invention is based on partial multiplications and inverses. Such are functions which approximate exact multiplication and division and satisfy certain technical estimates described below.

Let C be a fixed positive constant, typical $2^{512}$. A rational-valued function I(x) is a partial inverter if it satisfies $$0 \leq C^2/x - I(x) < u$$

for all positive integers x and for some constant u. For example, if C=100 and u=0.001, such a function is given by letting I(x) be obtained by computing the decimal expansion of 10000/x, and throwing away all digits after the three which follow the decimal. In particular, I(6)=1666.666.

An integer-valued function M(x,y) is a partial multiplier if it satisfies $$0 \leq xy/C^2 - M(x,y) < v$$

for all nonnegative x, y and for some constant $v \geq 1$. For example with v=1, M(x,y) could be the function which truncates $xy/C^2$ to an integer by discarding the fractional part.

Let p be a modulus, and let A be a constant, $A \geq p$. A number x is partially reduced mod p if $0 \leq x < A$. It is fully reduced mod p if $0 \leq x < p$.

Suppose $A = p(u+v)$ and $p < C$. Then $$M(x,I(p)) \leq xI(p)/C^2 \leq x(C^2/p)/C^2 = x/p$$

Hence if $x < C^2$ then $M(x,I(p)) < C^2/p$, and if $x < A^2$ then $M(x,I(p)) < p(u+v)^2$.

For $x \geq 0$, let $$R(x) = x - M(x,I(p))p$$

Then $R(x) \geq 0$ and $$M(x,I(p)) \geq xI(p)/C^2 - v \geq x(C^2/p - u)/C^2 - v$$

so $$pM(x,I(p)) \geq x - xpu/C^2 - pv$$

and $$R(x) \leq pux/C^2 + pv$$

Thus if $x < C^2$ then $$R(x) < pu + pv = A$$

Since $M(x,I(p))$ is an integer, x and $R(x)$ are in the same equivalence class mod p, so $R(x)$ is partial reduction of x. The partial reduction is also called a partial residue and the equivalence class is also called a residue class.

Cryptosystems commonly multiply integers mod p. This invention provides practical ways of working with partially reduced integers.

Suppose $A = p(u+v)$ and $p(u+v)^2 \leq C$. Then if x and y are partially reduced for this value of A, then it follows from the above analysis that $M(xy,I(p)) < C$ and $R(xy)$ is a partial reduction of xy.

Thus given a modulus p and a number $A > p$, a function R can be constructed such that for any two elements x and y in the set of integers $\{x: 0 \leq x < A\}$ can be combined to give $R(xy)$, another element of the set. The operation imparts a nonassociative semigroup structure to the set.

The nonassociative semigroup can be contrasted with ordinary modular multiplication. The set of integers $\{x: 0 \leq x < p\}$ is also a semigroup under modular multiplication. Two elements x and y can be combined to give xy mod p, another element of the set. It is a semigroup, meaning that it is closed under the operation and is associative, meaning that for any x, y, z in the set, $$((xy \bmod p)z) \bmod p = (x(yz \bmod p)) \bmod p$$

This associativity property is important in cryptographic applications. It means that powers are defined unambiguously, and two different computations of a power will yield the same answer. The function R is nonassociative, meaning that $R(R(xy)z)$ may not equal $R(xR(yz))$. Nevertheless, the function R is consistent with modular multiplication in the sense that $$R(xy) \bmod p = xy \bmod p.$$

This means that the function R can be used to calculate powers, and the powers will appear to depend on the order of the computation, but if the final result is fully reduced, then it will agree with the ordinary modular power.

Note that the bound A does not have to be explicit to be useful. Suppose, for example, you wish to compute $x^5$ mod p for some $x < p$ and you mere know that A exists and the function R has the required properties. Then you could compute it as $R(R(xx)R(R(xx)x))$ mod p. Since $x < p$, $x < A$, and it is a property of R that $R(xx) < A$. Hence the computation has all its intermediate values bounded by A. If $A < 2p$, as is usually the case, then the final modular reduction is simply a conditional subtraction of p.

Some cryptographic applications also require the modulus p to be prime, in which case nonzero elements have multiplicative inverses and there is additional algebraic structure.

A practical embodiment of a partial multipliers occurs on a binary digital processor. Large numbers are represented according to a base b, typically $2^{32}$ on a 32-bit processor. A number is stored in memory as a sequence of machine words, each word being less than b. The constant C is chosen to be $b^n$ for some n, typically 16 or 32. A number x is represented by $$x = \Sigma x_i b^i, 0 \leq i < n.$$

The product of two such numbers is $$xy = \Sigma x_i y_j b^{i+j}, 0 \leq i,j < n.$$

To compute $M(x,y)$, calculate $$\text{floor } \Sigma x_i y_j b^{i+j-n}, 0 \leq i,j < n, i+j \geq n-2.$$

The function floor takes the integer part, and discards the fractional part. Then the error due the partial multiply is bounded by n/b, so an acceptable value of v is $1 + n/b$.

Define a logarithm function by letting $L(x)$ be the least integer n with $b^n > x$. Let p be a modulus, possibly prime, and let $n = L(p)$. Hence $b^{n-1} \leq p < b^n$. Let the residual be $T(x) = b^{L(x)+n-1} - xp$. In binary notation, this residual is the twos complement of the product of x and p. Given some $A \geq p$, an integer x is said to be a partial inverse to p if $0 \leq T(x) < A$. For a particular value of the logarithm $L(x)$, a partial inverse is always given by $$x = \text{floor } b^{L(x)+n-1}/p.$$

Since multiplication or division by a power of b is just a shift, and is extremely cheap in base b arithmetic, such a partial inverse may be thought of as a reciprocal to p. For a given logarithm, there is just one partial inverse with $A = p$. If $A = b^n$, a common choice below, the partial inverse may not be unique.

Given a partial inverse, other partial inverses may be obtained by discarding trailing digits. To see this, suppose $0 \leq T(x) < A$ and $y = \text{floor } x/b$ is the number x with the least significant digit removed. Then $0 \leq T(y) < A/b + p(b-1)/b \leq A$. It is also possible to extend x to a longer partial inverse, but it might be necessary to increment it before appending digits, as explained below.

Define a partial multiplier M to be a function which satisfies $$0 \leq xyb^{-k} - M(k,x,y) < v$$

for some v, $1 \leq v < 2$. A good example with $v=1$ is $M(k,x,y) = \text{floor } xyb^{-k}$. Define a function S by $$S(k,x) = xb^k + M(L(x)+n-1-k,x,T(x)).$$

The function S is useful for constructing partial inverses. Suppose x is any number with $T(x) \geq 0$, such as any power of b. Then replacing x with $S(0,x)$ will eventually converge to some x with the same logarithm and $0 \leq T(x) < b^n$, although $T(x)$ might not be less than p.

Replacing x with $S(k,x)$ for k positive will increase the logarithm and give a longer partial inverse. For suppose $0 \leq T(x) < b^n$, $k < L(x)$, and $y = S(k,x)$. Then $$0 \leq T(y) - T(x)^2 b^{L(x)+n-k-1} < vp$$

so $$0 \leq T(y) < b^{n+k-L(x)+1} + vp < b^n + 2p.$$

With luck, y will be a partial inverse with $A = b^n$. If $T(y) \geq b^n$, note that $T(y+1) = T(y) - p$, so incrementing y once or twice will give the desired partial inverse.

Special properties of p can guarantee that such incrementing is not necessary. If $p \leq (b^n - b^{n-1})/v$ and $k < L(x) - 1$, then $T(y) < b^n$.

Partial reductions are relative to the constant A, at least as large as the modulus p. If your partial reductions are with $A = b^n$, then reducing a product can give a quotient with a nonzero spill word, and the residue can also have a nonzero spill word. By choosing p and A carefully, the spill word is always zero and need not be calculated.

It is a remarkable feature that these estimates depend only on properties of the modulus. Cryptosystems which can use a fixed modulus, such as ElGamal, DSA, or Elliptic Curve public key systems, can choose a modulus having the required properties. Then modular operations can be performed with the partial inverses, multiplies, and subtractions of this invention, thereby throwing bits away with the confidence that they will not matter to the final result. Cryptosystems like RSA which use many moduli can also benefit, because RSA has many multiplications with a particular modulus, and a modulus can easily be tested for the required properties.

Description of the Preferred Embodiment

The preferred embodiment uses a 32-bit processor, so the base b used to represent integers is $b = 2^{32}$ and the processor registers are 32 bits. The preferred partial multiplier $M(x,y)$ uses two extra 32-bit words. If multipliers do not exceed 64 words, then the error due to partial multiplies will be less than $64(2^{-32}) = 2^{-26}$. Hence the value $v = 1 + 2^{-26} = 1.00000040$ (in hexadecimal notation) may be taken. Moduli of other sizes can accordingly use other values of v.

Other embodiments might use processors with 16-bit or 64-bit registers. Other bases are also possible. The best value of v depends on the word size of the processor.

Another embodiment might be a mixture of 16-bit and 32-bit arithmetic. Such is particularly useful for DOS market, where there are 16-bit and 32-bit machines running the same software. These machines use the Intel processor architecture. Large integers can be stored as arrays of 16-bit or 32-bit words with the least significant words having the lower addresses in memory. This allows a program to use the same data structures for 16-bit and 32-bit processors, and then to use different instructions for the multipliers depending on which processor is actually present.

The preferred method for computing inverses uses several phases. The method starts in Phase 0 with an initial approximation x to an inverse consisting of two words. The choice of x can be any x with $T(x) \geq 0$. A possible choice is $x = b$.

If the method is implemented on a processor with a divide instruction, then division can give a much better choice of x. Prior art for such division is widely known, and depend on particulars of the processor divide instruction. The resulting x will also have $T(x) \geq 0$, but will tend to have a much smaller value of $T(x)$.

In Phase 1, the two word approximation x is iteratively improved. Until $T(x) < b^n$, x is replaced with $S(0,x)$. Depending on how good the initial approximation was, this might take several dozen iterations.

In Phase 2, x is replaced with $S(k,x)$ for some $k < L(x)$. If $T(x) \geq b^n$ then x is incremented until $T(x) < b^n$. Note that $T(x+1)$ may be easily computed from $T(x)$ using the formula $T(x+1) = T(x) - p$. Preferably, a partial multiply is used for $T(x)$, with the $(n+1)$-th word being the spill word.

Phase 3 only applies to a favorable modulus. For some $k < L(x) - 1$, x is replaced with $S(k,x)$. The property $0 \leq T(x) < b^n$ continues to hold automatically, and need not be checked. As a result, $T(x)$ can be calculated with a partial multiply in which only the least significant n words are computed.

Note that $S(k,x)$ is defined in terms of $T(x)$, so it is not necessary to recalculate $T(x)$ in the calculation of $S(k,x)$.

An alternate embodiment might use portions of the modulus for some intermediate computations. A k-word inverse can be well approximated by using only the top k or so most significant words of the modulus. The computation of $T(x)$ and $S(k,x)$ is somewhat more efficient if fewer words of the modulus is used.

Figure 1:
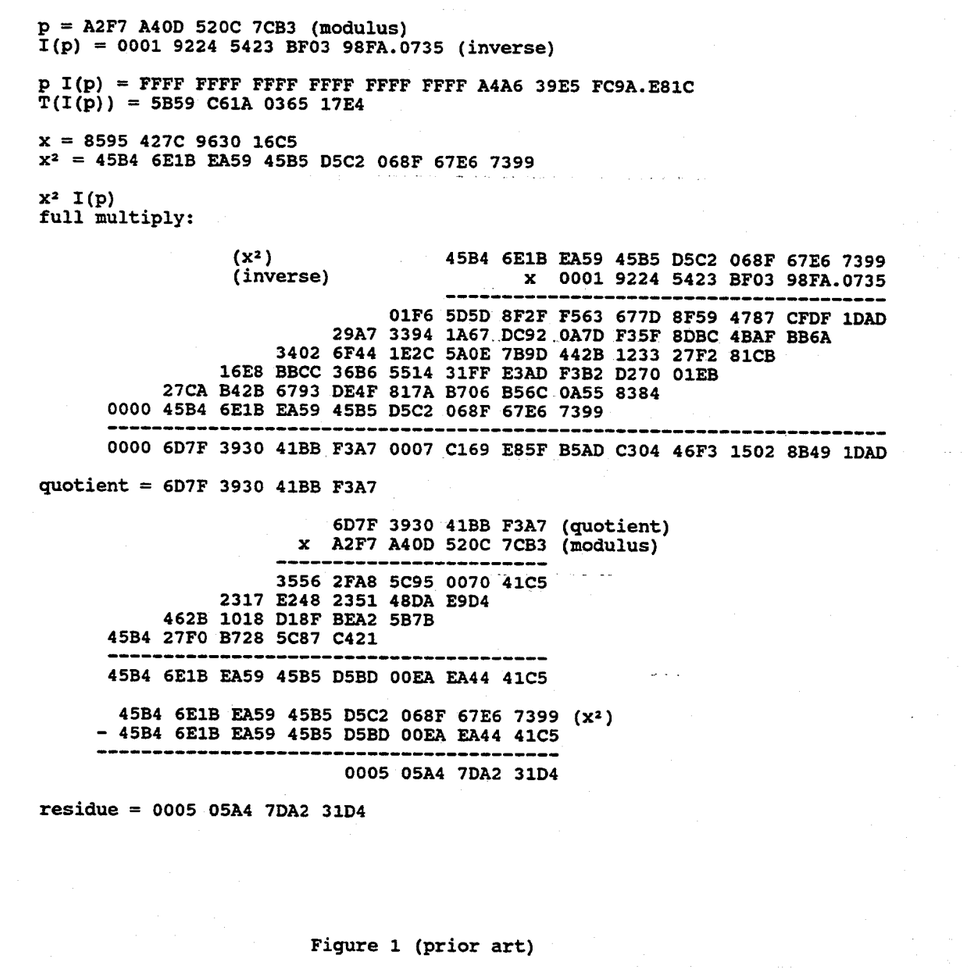
FIG. 1 shows a modular reduction of a product using a prior art method.

FIG. 1 shows a modular reduction of a product using a prior art method. The modulus in hexadecimal notation is A2F7 A40D 520C 7CB3. Spaces have been inserted in these numbers to make them more readable, and to emphasize the machine representation. In this case, a 16-bit processor is being used, and each set of four hex digits represents one 1-bit word. A 16-bit word may be conceptualized as one computer digit. The modulus happens to be prime. It is too small to be useful cryptographically, but serves to illustrate modular reduction ideas.

The modulus inverse is also shown in FIG. 1. The decimal point, or more precisely the radix or hexadecimal point, is a normalization consistent with the formulas involving I(p), but does not necessarily affect a computer representation. The modulus multiplied by the inverse is shown, along with $T(I(p))$. The product is slightly less than a power of $b = 2^{16}$. The fact that $T(I(p))$ is positive and less than p shows that I(p) is the best possible inverse of that length.

The number x in FIG. 1 is a typical residue. The object is to square it, and reduce modulo p. The square $x^2$ is eight words long and the inverse of p is 6 words long. The multiplication of $x^2$ by the inverse is shown in detail much the same as a schoolchild would multiply an 8-digit number by a 6-digit number. The 16-bit computer works base $2^{16}$ on an analogous manner to the way a schoolchild works base 10.

The quotient $x^2/p$ is truncated to an integer by discarding the last nine words of the product. FIG. 1 then shows multiplying the quotient by the modulus in detail, and subtracting the product from $x^2$. The result is a four-word residue smaller than the modulus. It is the modular reduction of $x^2$.

Figure 2:
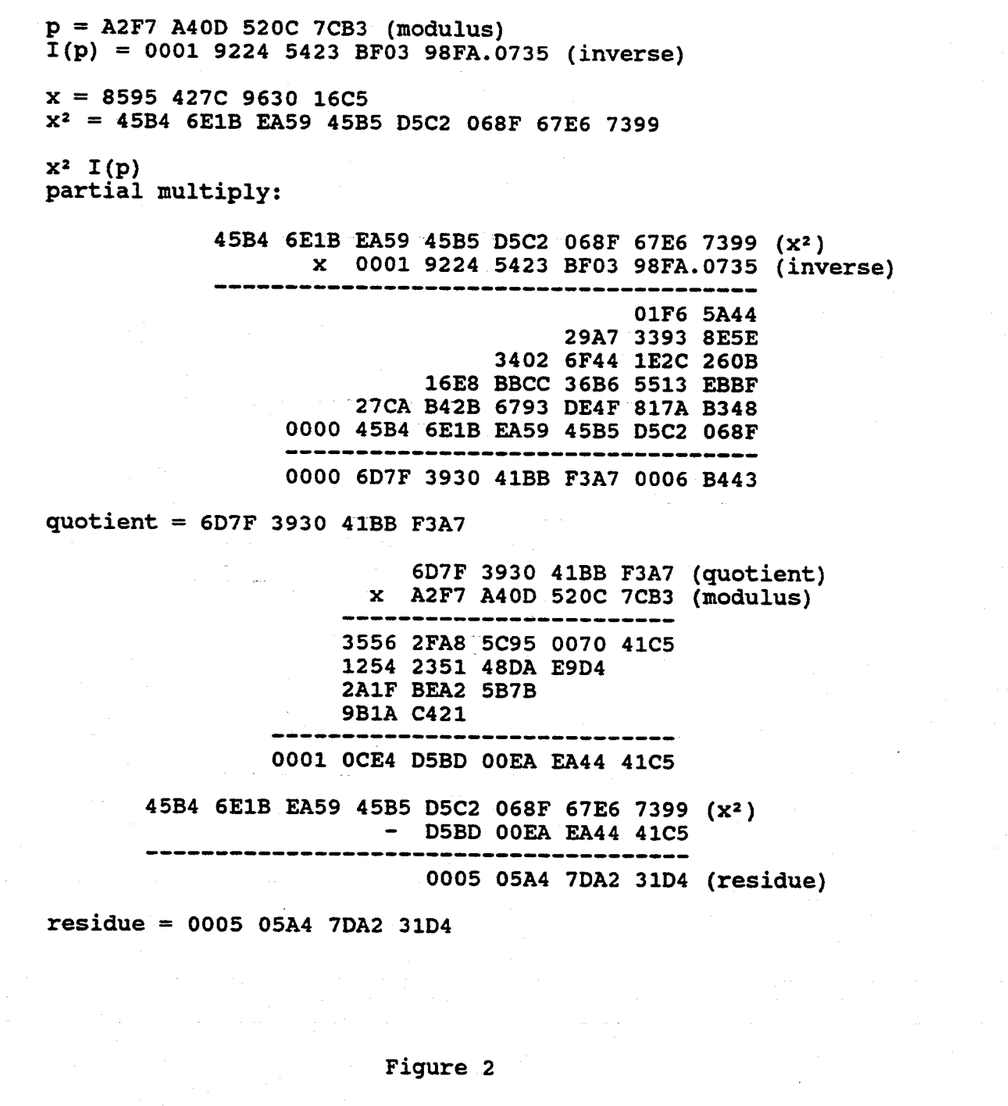
FIG. 2 shows a modular reduction of a product using partial products.

FIG. 2 shows an improved modular reduction method The steps are all the same as in FIG. 1, except that partial multiplies are used instead of full multiplies. In the product of $x^2$ with $I(p)$, most of the discarded words are not calculated. The truncated quotient is the same. The value of the two discarded words, 0006 B443, is close to the 0007 C169 calculated in FIG. 1, but not identical. In calculating the quotient multiplied by the modulus, the words which are known to cancel are not calculated. Only the least significant four words are subtracted from $x^2$, giving the same residue as that in FIG. 1.

Figure 3:
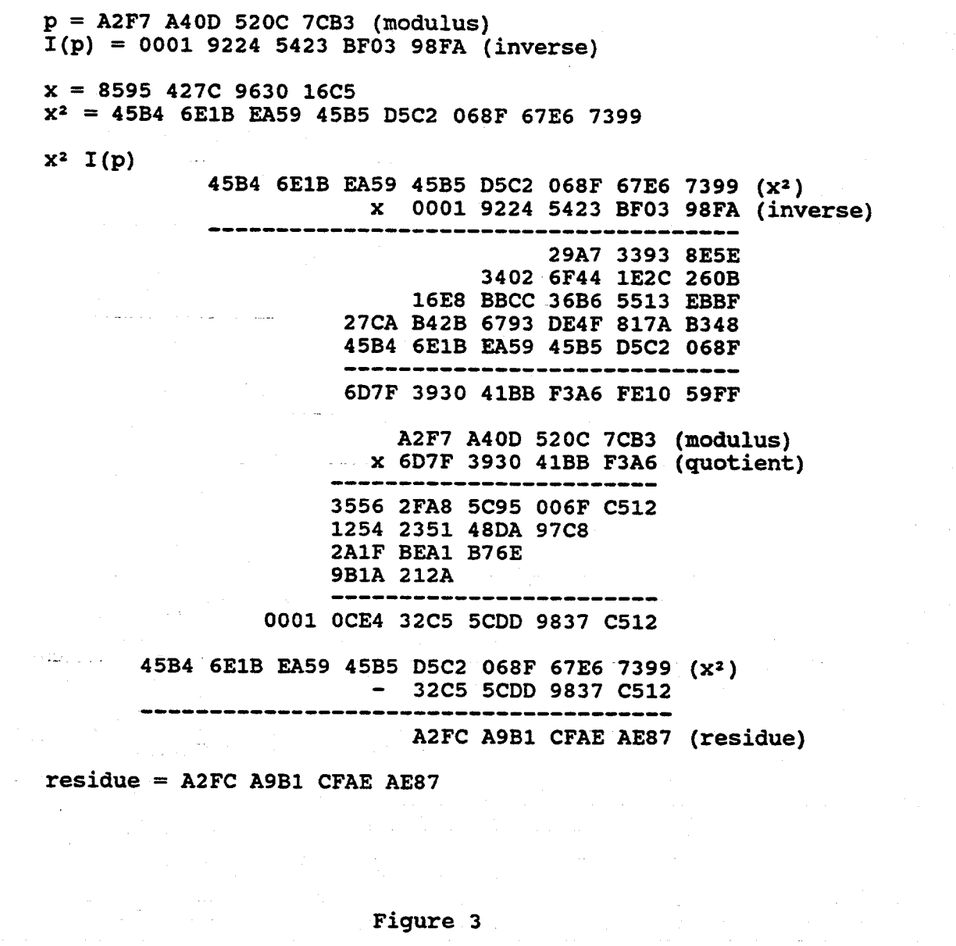
FIG. 3 shows a modular reduction of a product using partial products and a compact inverse.

FIG. 3 shows a computation similar to FIG. 2, but a more compact form of the inverse is used. The fractional part of the inverse $I(p)$ in FIG. 2, 0.0735, is sufficiently small that it can be discarded. The computation is slightly simpler, as now the terms which involved the 0735 can be omitted. However, the computed quotient is now slightly smaller, being 6D7F 3930 41BB F3A6.-FE10 59FF instead of 6D7F 3930 41BB F3A7.0006 B443 of FIG. 2 or 6D7F 3930 41BB F3A7.0007 . . . of FIG. 1. The difference is small, but because of bad luck, it happens that it is enough to alter the truncated quotient. This quotient is then used to compute the residue. The residue is larger than the one calculated in FIGS. 1 and 2. It is in the same equivalence class modulo p, but the residue in FIG. 3 is not less than p. Only a partial reduction modulo p has been achieved.

Actually the bad luck which occurs in FIG. 3 could have occurred in FIGS. 1 and 2, and does occur for other input values. Exposure to such bad luck is inherent in the method because the inverse is only approximate and because the partial multiply only approximates the true multiply. However, even though the residue might be greater than p, it is always in the right equivalence class and is always no more than four words long, no matter what choice of x ($0 \leq x < p$) is made.

This last statement is very remarkable, and it is an important point that not every modulus has this property. In fact, most moduli do not. The modulus p shown in FIGS. 1-3 has the property. The property is important because it simplifies and expedites processing of cryptovariables. In a public key cryptosystem, a very common operation is to multiply two residues and then reduce the product with respect to the modulus. A partial, or incomplete, modular reduction is mathematically equivalent for many purposes, but if the residue occupies more words than the modulus then it can be cumbersome to deal with.

When raising a residue to a power, the multiply-and-modular-reduce operation is repeated many times. It might seem that if residues are allowed to get larger than the modulus because of a lack of precision in computation, then errors might accumulate to the point where the residue is longer in words than the modulus. However, this is not the case for the modulus and method illustrated in FIG. 3. Given any two residues less than the modulus p in FIG. 3, the method of FIG. 3 applied to the product will yield a quotient and a residue that do not exceed four words each. Furthermore, the same result holds for any residue which result from this method. Thus a residue can be raised to power, possibly involving hundreds of multiplications and partial modular reductions, with total confidence that the various quotients and residues will not exceed the word size of the modulus.

Figure 4:
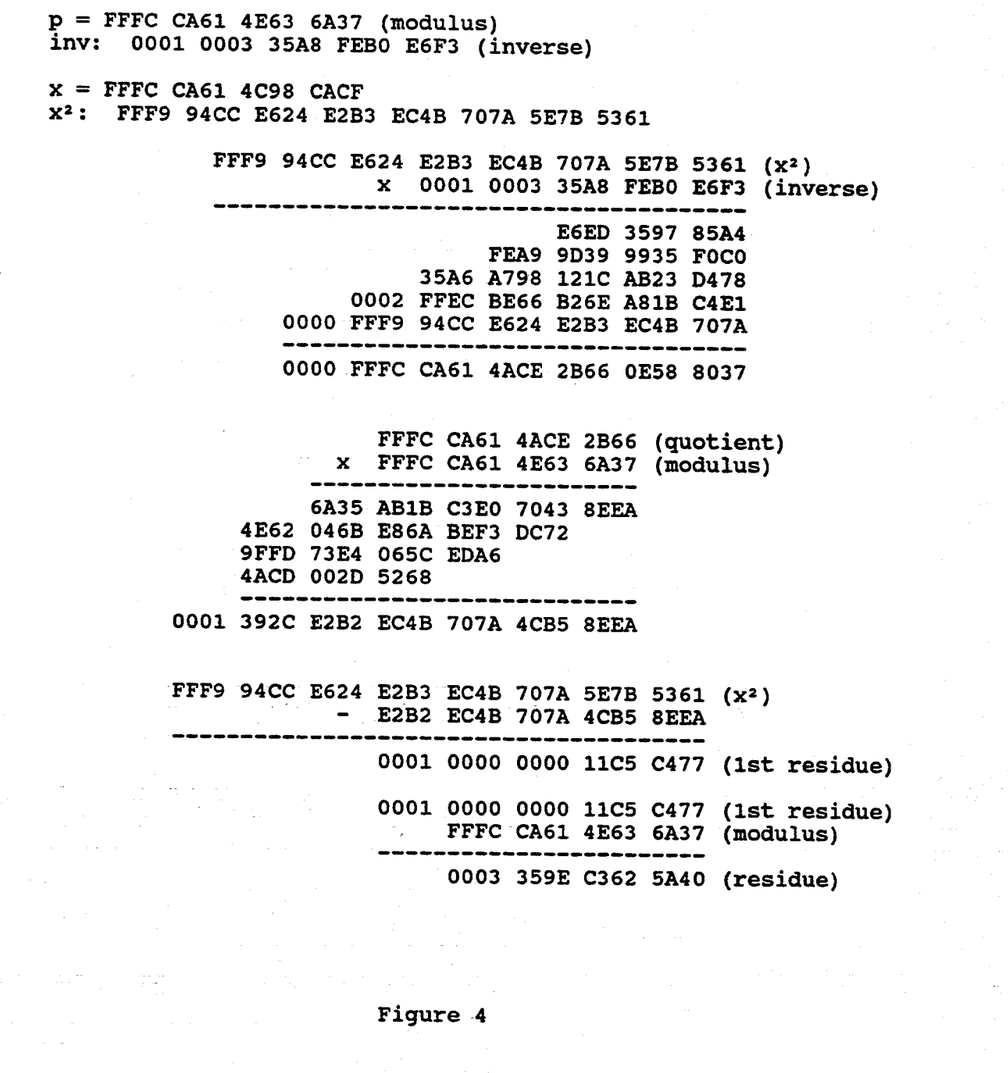
FIG. 4 shows a modular reduction using a spill word.

Again, it is noted that not every modulus has this remarkable property. A modulus which does not is shown in FIG. 4. The value of x is less than the modulus, as in FIGS. 1-3. The method of partial reduction is the similar to that of FIG. 3, but an extra word of precision is carried in case the quotient or residue spill over to an extra word. This extra word is called the spill word. When the residue is calculated, called the 1st residue in FIG. 4, the still word is tested to determine whether it is zero. If it is nonzero, the modulus is subtracted from the residue until the spill word is zero. In FIG. 4, one such subtraction is needed.

Note that in FIGS. 2 and 3 some columns were summed which were not actually needed. For example, the sum 0001 0CE4 32C5 5CDD 9837 C512 in FIG. 3 has two unneeded words because only 32C5 5CDD 9837 C512 is used in the subtraction. The preferred embodiment sums these extra columns because it is cumbersome to avoid them. Another embodiment might avoid them.

For a different value of x, the final subtraction in FIG. 3 might appear to generate a borrow. That is, a 4-word number is subtracted from a smaller 4-word number using unsigned arithmetic. On many processors, such a subtraction will set a carry bit, also called a borrow bit in this context. Usually the borrow bit is to be subtracted from the next word, or it is used to converted the difference into a negative number. In the partial reduction method of FIG. 3, the borrow bit is just ignored. A partial subtraction is being used, and the correctness of the method guarantees that the borrow bit would neatly cancel out if a full subtraction were to be used.

Figure 5:
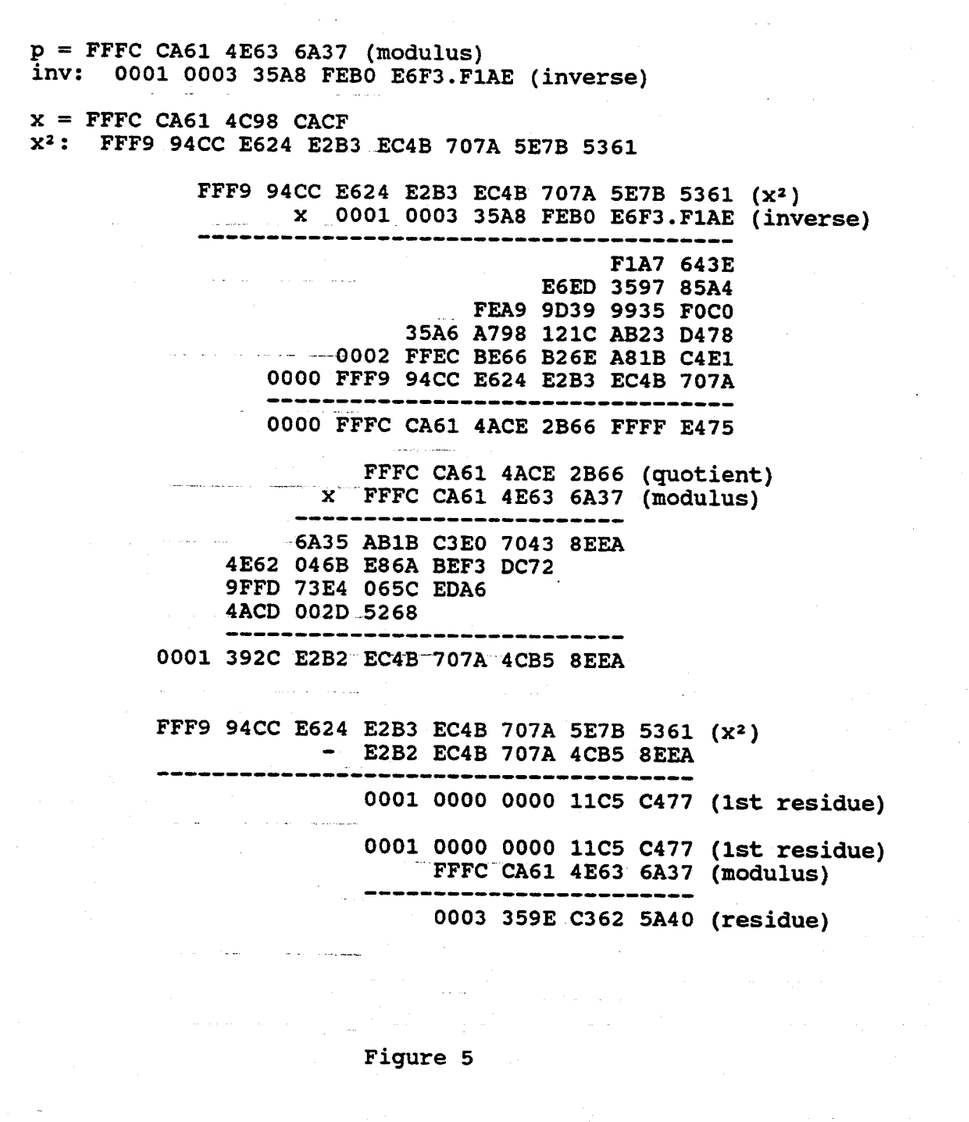
FIG. 5 shows a modular reduction using a spill word and a modulus not having a compact inverse.

In FIG. 4, the major part of the error in computing the quotient is the lack of precision in the inverse. The preferred embodiment uses an extra word of precision in the inverse, as shown in FIG. 5. The extra precision makes it a lot less likely that the spill word will be nonzero. Actually, the spill word is again nonzero in FIG. 5, but only because of extraordinary bad luck. The fractional part of the quotient is 0.FFFF E475. If a full multiply had been used instead of a partial multiply, the computed quotient would be FFFC CA61 4ACE 2B67.0003 35A8 . . . , and the spill word would be zero. There are other examples where even the full multiply does not avoid a nonzero spill word.

Figure 6:
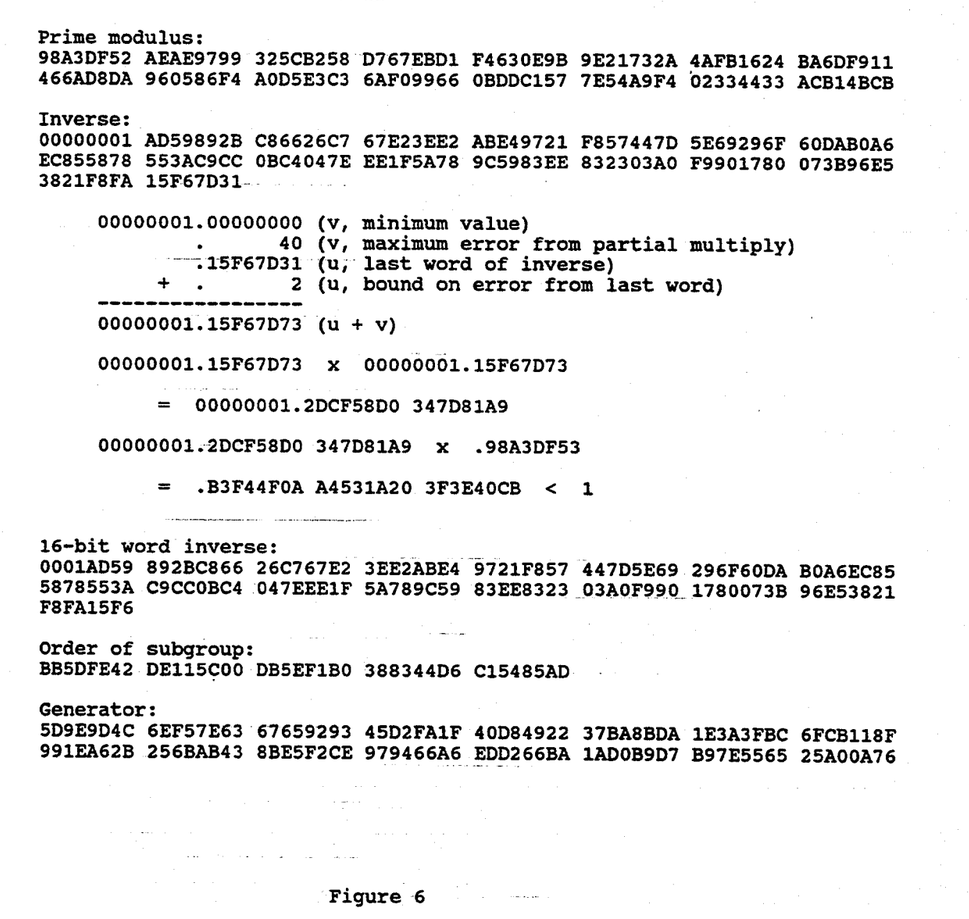
FIG. 6 shows a 512-bit prime modulus having the compact inverse property.

FIG. 6 shows a 512-bit prime modulus. It is written in terms of 32-bit words because that is the most common processor word size. The inverse to the modulus is shown to 18-word precision. It has the compact inverse property, meaning that 17 words are adequate and the last word can be omitted. Partial reduction has all the nice properties of the method of FIG. 3. You can use the compact inverse, ignore the spill word, be assured that quotients and residues will have no more words than the modulus, and iterate without any of these niceties failing. The computation that shows that the modulus has all these wonderful properties is also shown in FIG. 6. By the above analysis, it suffice to show that $p(u+v)^2 \, b^{-n} \leq 1$ where p is the modulus, $n = L(p)$, $b = 2^{32}$ is the base, u is a bound on the accuracy of the inverse, and v is a bound on the accuracy of the quotient obtained by a partial multiply.

The bound v is at least one, plus whatever error is due to the terms discarded by the partial multiply. For 32-bit words the value 1.00000040 hex may be taken. The bound u in the accuracy of a 17-word inverse may be obtained by looking at the 18-th word. The 18-th word might be too low by 1 because of an inexact rounding, but it won't be too low by 2, so 2 can be added to the 18-th word to give a value for u. The bound for $p\,b^{-n}$ may be taken to be 0.98A3DF53, as may be seen by looking at the most significant word of the modulus. FIG. 6 shows the computation of u+v, its square, multiplication by a bound for $pb^{-n}$, and verification that it is less than one.

FIG. 6 also shows a 512-bit generator of a multiplicative subgroup. It has the order shown, meaning that you will get one if you raise the generator to that order. The order is a 160-bit prime.

FIG. 7 shows a 1024-bit prime modulus also having the compact inverse property. The computation showing that it has the compact inverse property is shogun. It is similar to FIG. 6. A generator for a multiplicative subgroup is also given. The order is the same as in FIG. 6.

The specific primes of FIGS. 6 and 7 were found using the NIST recommendation for producing a secure modulus. In NIST terminology, the 160-bit seed

---
D1228957 EB28279F 40CD5D9A 901A6A76 FD148B57
--- produced the 512-bit prime with counter=118, and the 1024-bit prime with counter=106. Various seeds were tried until this one generated primes with the required properties.

The final items in FIGS. 6 and 7 is the 16-bit word inverse. It is essentially the same as the 32-bit inverse except that the leading 16 bits is 0001 instead of the leading 32 bits being 00000001. The 16-bit inverse is provided, and shown in 32-bit notation because of an embodiment for the DOS market. If the words are stored in consecutive memory locations according to the byte ordering conventions for the processor, then either a 16-bit or 32-bit multiply can be applied to it.

Figure 8:
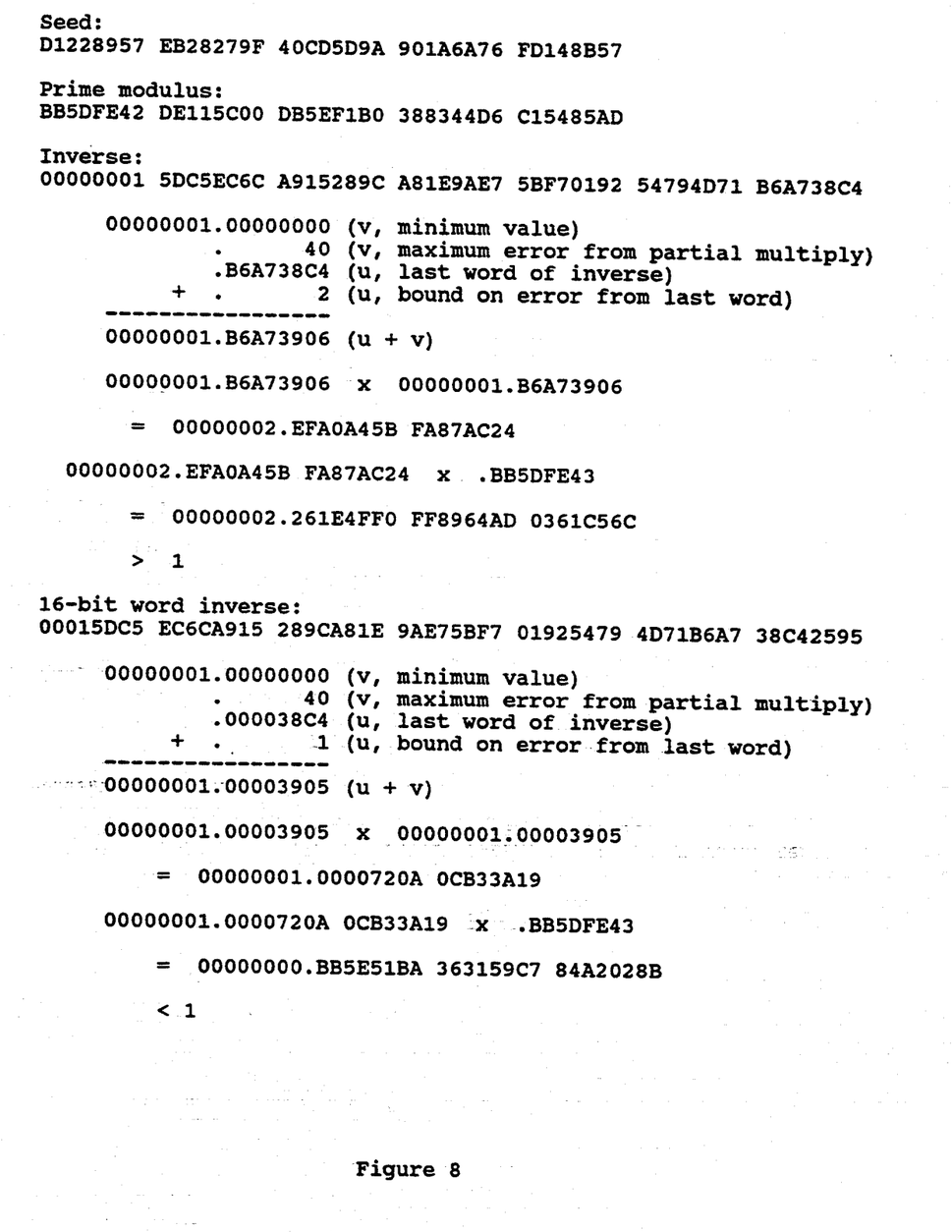
FIG. 8 shows a 160-bit prime modulus not having the compact inverse property.

FIG. 8 shows a 160-bit prime modulus not having the compact inverse property. It was derived using the NIST secure prime generation algorithm with the seed value shown. The same seed gave the primes in FIGS. 6 and 7. The inverse is shown as 7 32-bit words, as it would be computed on a 32-bit machine. The computation of u+v and $p(u+v)^2 b^{-n}$ proceeds exactly as in FIGS. 6 and 7, but gives 2.261E . . . which is greater than 1.0. Thus this modulus fails the compact inverse property test, and a 6-word representation of the inverse might not avoid the spill word. A 16-bit inverse is shown, in 6 32-bit words. The computation of $p(u+v)^2 b^{-n}$ is repeated proceeds exactly as in FIGS. 6 and 7, but instead u is based on using the first 6 32-bit words of the 16-bit inverse. The value of v is based on using a 32-bit partial multiply, as before. The result is less than 1.0, implying that a partial modular reduction can omit the last 32-bit word and avoid a spill word.

Figure 9:
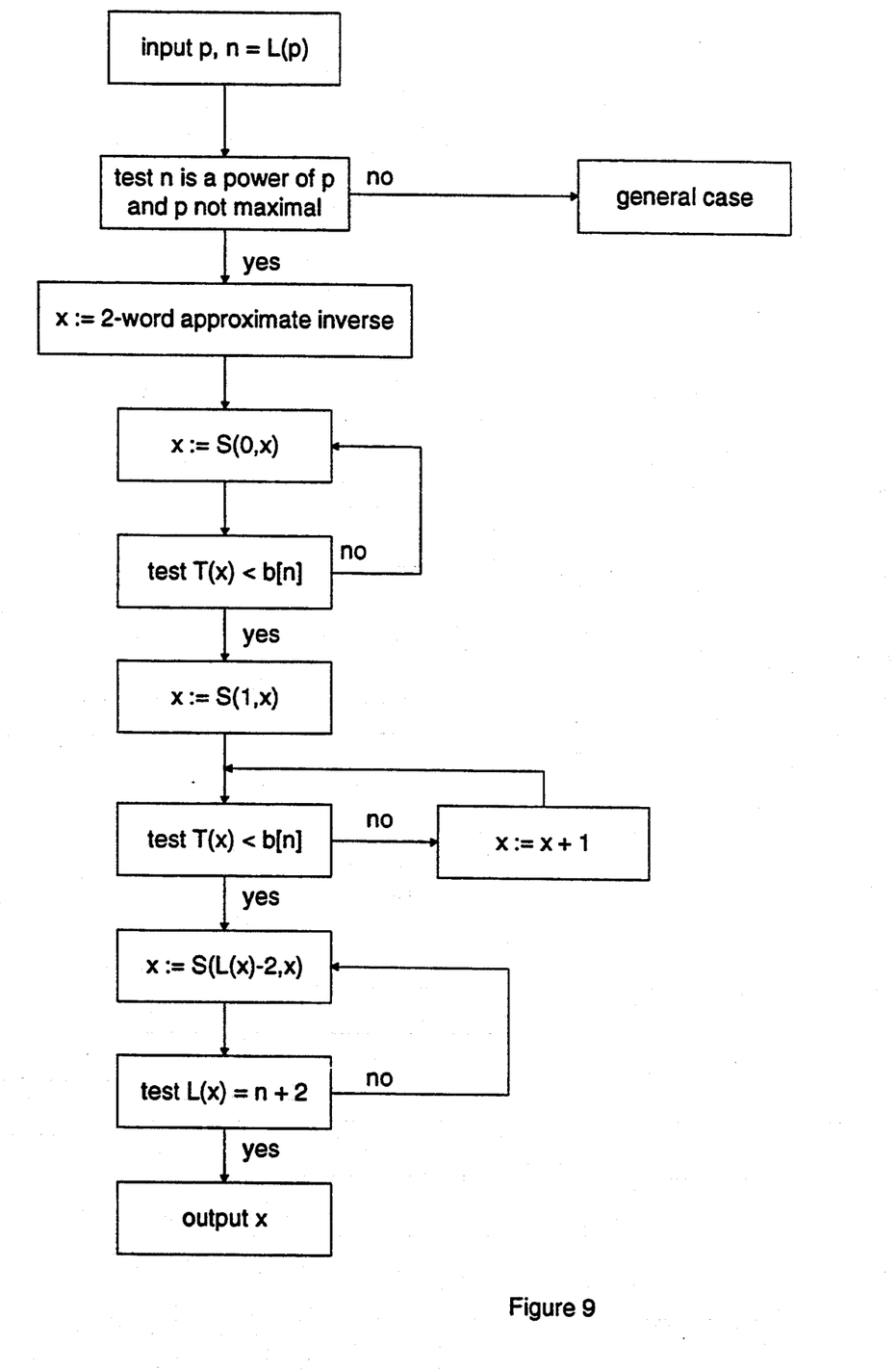
FIG. 9 shows a flow diagram for inverting a modulus in favorable cases.

FIG. 9 shows a flow diagram for inverting a modulus in favorable cases. The method is tuned to be optimal for a modulus whose length, in words, is a power of two, and whose most significant word is not maximal. On a 32-bit word system, it is sufficient to show that a modulus is not maximal by testing that any of the top 25 bits is zero. The first step in FIG. 9 is to input p, the modulus, and n=L(D), its logarithm. The modulus p is stored in n words, with the most significant word being nonzero. Then the input is tested to make sure it really is a favorable case. If so, the variable x is assigned a 2-word approximate inverse to p. Such an approximation can be obtained from a hardware divide, if available, or the value b, the base, can be taken. Then x is replaced with S(0,x) until x satisfies $T(x)<b^n$. Once that inequality is achieved, x is a satisfactory 2-word inverse, and x is replaced with S(1,x) to get a 3-word inverse. If $T(x)<b^n$ then that inverse is satisfactory. Otherwise, x is incremented and T(x) replaced with T(x)−p until $T(x)<b^n$. Then the method moves into Phase 3 iterations, replacing x with S(L(x)−2,x). These guarantee that $0 \leq T(x) < b^n$. The Phase 3 iterations are repeated until the desired precision is achieved, namely when L(x)=n+2, then x is output as the inverse.

Figure 10:
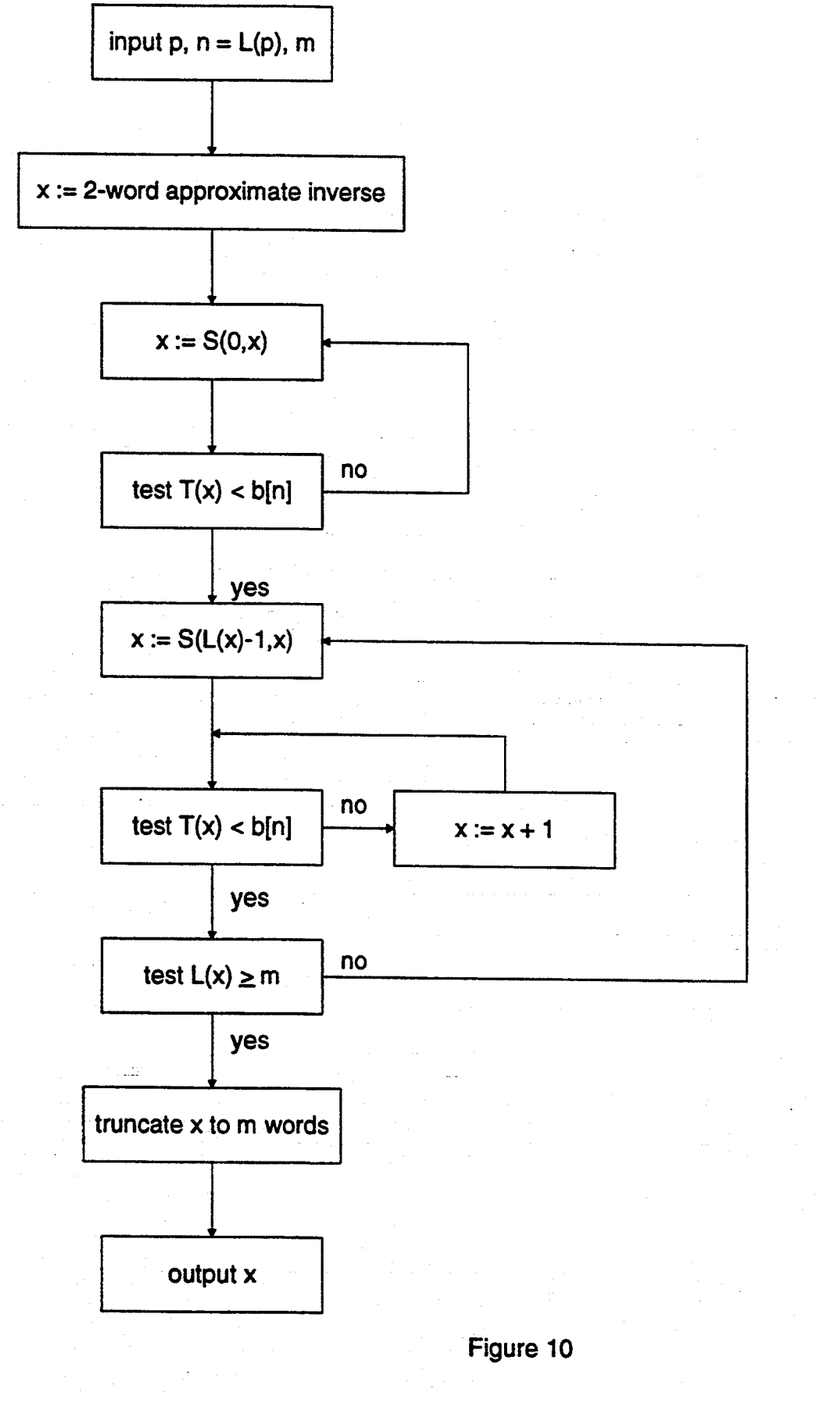
FIG. 10 shows a flow diagram for inverting a modulus in the general case.

FIG. 10 shows a flow diagram for inverting a modulus in the general case. The modulus p is input, along with n=L(x) and an integer m which is the desired length for the inverse. Then the variable x is set equal to a 2-word approximation to the inverse. As in the favorable case in FIG. 9, x is replaced with S(0,x) until $T(x)<b^n$. Once the 2-word inverse is achieved, the method passes to Phase 2 where x is replaced with S(L(x)−1,x). Each new x is tested to see if $T(x)<b^n$. If not, x is incremented until $T(x)<b^n$.

In the computation of T(x) in Phase 2, a partial multiply can be used in which only the least significant n+1 words are calculated. The (n+1)-th word is the spill word which exists to handle rare carries. The test $T(x)<b^n$ merely tests the spill word to see if it is zero.

In an alternative embodiment of the method in FIG. 10, the Phase 2 iteration replaces x with S(k,x) for k<L(x). The values of k can be chosen so that the final truncation is not needed.

Figure 11:
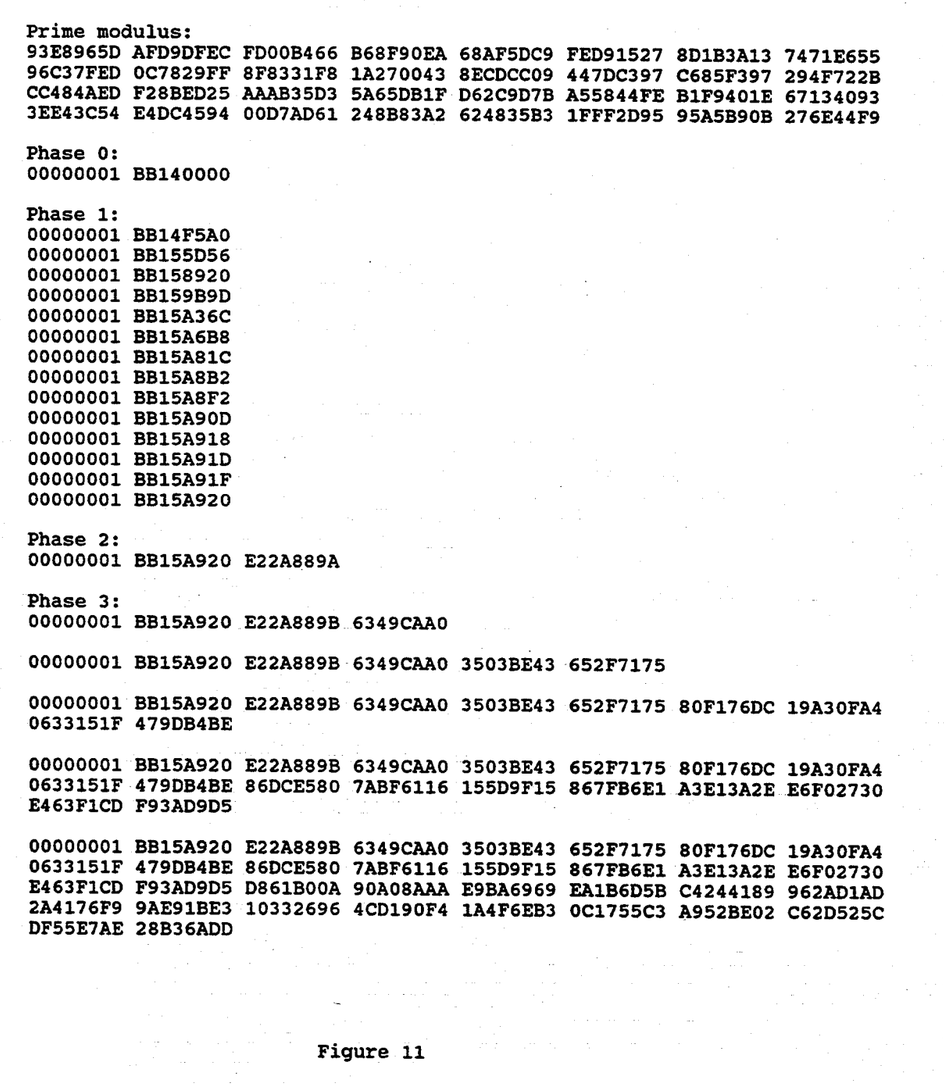
FIG. 11 shows iterations for the inverse of a 512-bit modulus.

FIG. 11 shows iterations for the inverse of the modulus shown in FIG. 7. The initial approximation in Phase 0 was based on a 16-bit hardware divide instruction. (Another embodiment might use a 32-bit divide, or might simply use the value 00000001 00000000. A 32-bit divide would avoid nearly all of the Phase 1 iterations.) Phase 1 uses 14 iterations until it finally converges to a satisfactory 2-word inverse. Phase 2 produced a 3-word inverse. T(x) was tested, and no adjustment was necessary. Because the modulus was found to be favorable, the method jumped to Phase 3 for subsequent iterations, producing inverses of lengths 4, 6, 10, 18, and 34 words. Each iteration nearly doubles the precision of the inverse. Phase 3 iterations automatically have sufficient accuracy, so no test need be performed. The last bit may not be rounded optimally, but it will not matter.

The preferred embodiment frequently has a 1 as the most significant word of the inverse. This happens for any prime modulus whose most significant bit is 1. The inverse is used as a multiplier. In an alternate embodiment, the multiplier might take advantage of the 1 in the inverse. Instead of multiplying certain words by 1, those words can simply be copied. Some further efficiency is gained if the copying is done before other multiplies. Usually a multiplier zeroes the array which is to hold the result, and then adds various products into the array. Copying certain words into the result array first saves zeroing those words. See, for example, FIG. 2 where the last summand in the partial multiplication $x^2 I(p)$ coincides with the most significant six words of $x^2$. That summand could have been produced by copying words from $x^2$, and then the partial multiplication could be obtained by adding the other product terms into that summand.

Another embodiment might use a shift to represent the inverse more compactly. If the leading word of the inverse is 1, shifting it to the right makes the leading word 0, and hence the inverse can be stored with one fewer word. Mathematically it is equivalent to dividing by two. Instead of multiplying by the inverse, an embodiment could multiply by the shifted inverse, and then multiply by two by applying a shift to the left. Using the shifted inverse has the advantage of requiring fewer multiplies, but requires some extra shifts. Use of a shifted inverse might be advantageous on a processor where shifts are very much faster than multiplies.

Note that finding a modulus with the compact inverse property depends on the hardware implementation of the partial multiplier, which in turn depends on computer word size. The values obtainable for u and v will be different for 16-bit and 32-bit machines. A modulus and inverse might require a spill word on a 16-bit machine, but not a 32-bit machine.

The necessity of using a spill word depends on several factors. It depends on the modulus, the inverse, and the partial multiply. The inverse depends on the modulus, but also on how many words of precision are used. If an (n+2)-word modulus inverse is used, then u can be taken sufficiently small that a spill word can be avoided with most moduli. If the word size is 32 bits, then one can take u=0.00000002 and v=1.00000040 (in hex). The condition on the modulus p is then that $p(u+v)^2$ is less than the next power of b, and will be satisfied if any of the top 25 most significant bits of p are zero.

On a 32-bit system with a 16-bit inverse, as shown in FIG. 8, the condition is more restrictive. There the inverse was computed to extra precision and truncated, so the error in the inverse is no worse than one unit in the last place, and one can take u=0.00010000 and v=1.00000040 (in hex). A modulus will assure the spill word is zero if any of the top 15 most significant bits are zero.

The most common modular reduction in cryptosystems is that of a product of two numbers which have already been reduced. But modular reduction of other numbers is also sometimes required. For example, in the DSA, it is necessary to calculate a number which is 512 bits or longer and reduce it with respect to a 160-bit modulus. The partial modular reduction method of this invention can also be applied to such a situation.

Given a modulus p, a partial inverse x satisfying $$T(x) = b^{L(x)+n-1} - px < A$$

(where n=L(x) and $A \leq b^n$), and an integer y of arbitrary length, the method is as follows. Let M be a partial multiply, an integer satisfying $$0 \leq xyb^{1-n-L(x)} - M < v$$

for some v, $1 \leq v < 2$. Let R(y) = y - pM be a reduction of y. It follows that $$R(y) \geq y - pxyb^{1-n-L(x)} = yT(x)b^{1-n-L(x)} \geq 0$$

and $$R(y) \leq yT(x)b^{1-n-L(x)} + vp$$

-continued $$\leq yAb^{1-n-L(x)}$$

$$< yb^{1-L(x)} + vp.$$

Thus $0 \leq R(y) < b^k$ where k=1+max(L(y)−L(x)+1,n), and the length of y has been reduced to k words. The product pM can be computed with a partial multiply in which only the least significant k words are accurate.

This estimate includes the possibility of a spill word which might be 0, 1, or 2. It is possible to ignore the spill word and take k=max(L(y)−L(x)+1,n) under favorable circumstances. For example, if L(y)>L(x)+n−1, the spill word will be zero if only at least one of the top several bits of y is zero.

In case the spill word must be calculated, it will usually be zero and can be eliminated cheaply. Just subtract $pb^m$ from R(y) once or twice, where m=max(0,−L(y)−L(x)−n+1).

Once y has been reduced to a quantity having a fewer number of words, the process can be repeated until it has been reduced to n words. The number of steps required depends on the length of y and the inverse x. Another embodiment might choose a longer inverse x in order to reduce the number of steps, if desired.

The preferred embodiment of this invention is on a general purpose computer processor with registers suitable for holding and operating on machine words. An alternate embodiment might be on several processors, using parallelism to speed up the multiplies. Still another embodiment might be on a custom integrated circuit. Such an integrated circuit may or may not use parallelism.

The scope of the invention should be determined by the appended claims and their legal equivalents.

I claim:

1. In a cryptosystem, a method for inverting a cryptovariable comprising
   inputting said cryptovariable and representing it as an integer;
   constructing an approximate inverse to said integer;
   computing a residual of said inverse by taking a twos complement of a product of said integer with said inverse;
   testing a spill word included in said residual;
   improving the accuracy of said inverse until said spill word is zero;
   partial multiplying said inverse by said residual and adding a shift of said inverse;
   repeating until desired length and accuracy is obtained; and
   outputting said inverse.

2. The method of claim 1 further comprising
   testing said cryptovariable for maximal condition;
   using iterations which assure that said spill word will be zero; and
   using a partial multiply to compute said residual.

3. The method of claim 1 further comprising shortening said cryptovariable for intermediate results.

4. The method of claim 1 further comprising truncating said inverse to reduce precision.

5. The method of claim 1 further comprising representing said inverse in terms of a base and using a power of said base to obtain said approximate inverse.

6. The method of claim 1 further comprising a sequence of logarithms 2, 3, 4, 6, 10, 18, 34 ... as lengths for iterations of said inverse.

7. The method of claim 1 where said cryptosystem is of modular exponential type and said cryptovariable is a modulus.

8. The method of claim 1 further comprising using said inverse for the modular reduction of other cryptovariables and products of cryptovariables.

9. In a cryptosystem, a method for modular reduction comprising
inputting a modulus;
inputting an inverse to said modulus;
inputting a cryptovariable;
partial multiplying said cryptovariable by said inverse to obtain an integer quotient;
partial multiplying said integer quotient by said modulus and partial subtracting from said cryptovariable to obtain a partial residue.

10. The method of claim 9 further comprising
testing a spill word of said partial residue;
partial subtracting said modulus from said partial residue if said spill word is nonzero; and
repeating until said spill word is zero.

11. The method of claim 10 further comprising testing said modulus and said inverse for a condition that assures that said spill word will be zero.

12. The method of claim 9 further comprising computing said inverse from said modulus.

13. The method of claim 9 further comprising testing said cryptovariable for a condition that assures that a quotient spill word will be zero.

14. The method of claim 9 further comprising obtaining said cryptovariable by multiplying two other cryptovariables.

15. The method of claim 9 further comprising obtaining said cryptovariable by multiplying two other cryptovariables with a subquadratic multiplier.

16. The method of claim 9 further comprising
testing for a leading one in said inverse;
copying words from said cryptovariable to achieve multiplication by one; and
accumulating other products to said copied words in order to obtained said quotient.

17. The method of claim 9 further comprising
shifting said inverse so that storage requirements are reduced for said inverse; and
shifting the product of said shifted inverse to obtain said quotient.

18. The method of claim 9 further comprising comparing said partial residue to said modulus and possibly subtracting, whereby resultant residue is fully reduced and less than said modulus.

19. The method of claim 9 further comprising repeating said partial multiplying and subtracting for further modular reduction, and conditionally subtracting said modulus to achieve full reduction.

20. The method of claim 9 further comprising generating public key messages.

21. A system for partial modular reduction of cryptographic variables, comprising
a processor unit;
registers in said processor;
addition, subtraction, and multiplication operations on said registers;
a partial multiplier using said operations;
means to input a modulus;
means to input a cryptovariable;
means for partial multiplying said cryptovariable by said inverse to obtain an integer quotient;
means for partial multiplying said integer quotient by said modulus and partial subtracting from said cryptovariable to obtain a partial residue.

22. The system of claim 21 further comprising
means for testing a spill word of said partial residue;
means for partial subtracting said modulus from said partial residue if said spill word is nonzero; and
means to repeat until said spill word is zero.

23. The system of claim 22 further comprising means for testing said modulus and said inverse for a condition that assures that said spill word will be zero.

24. The system of claim 21 further comprising a subquadratic multiplier.

25. The system of claim 21 further comprising means for conditionally subtracting said modulus from said partial residue and output a fully reduced residue.

26. A method for generating a cryptographic modulus comprising
generating pseudorandom bits;
constructing a modulus from said bits;
computing a partial inverse to said modulus;
estimating the accuracy of said partial inverse;
choosing a partial multiplier function;
estimating the accuracy of said partial multiplier function;
combining said accuracy estimates for a size test on said modulus; and
repeating until said size test is successful.

27. The method of claim 26 wherein said size test is for a zero among the most significant several bits in said modulus.

28. The method of claim 26 wherein said size test guarantees that a modular reduction spill word is zero.

29. The method of claim 26 further comprising testing said modulus for primality.

30. The method of claim 26 further comprising choosing said modulus to have a multiplicative subgroup whose order is a prime of at least 160 bits.

31. The method of claim 26 further comprising choosing DSA parameters according to NIST secure modulus method.

32. The method of claim 26 where said inverse can be stored compactly and still have sufficient accuracy for said size test.

33. A cryptosystem, comprising
means to input a cryptovariable;
means to multiply said cryptovariable to form a product;
a modulus means;
means to reduce the product with respect to said modulus means; and
said modulus means having an input port for setting the modulus equal to the prime

| 98A3DF52 | AEAE9799 | 325CB258 | D767EBD1 | F4630E9B | 9E21732A | 4AFB1624 | BA6DF911 |
| 466AD8DA | 960586F4 | A0D5E3C3 | 6AF09966 | 0BDDC157 | 7E54A9F4 | 02334433 | ACB14BCB. |

34. The cryptosystem of claim 33 wherein said cryptosystem is based on the discrete logarithm problem.

35. The cryptosystem of claim 33 wherein said cryptosystem is based on elliptic curves.

36. The cryptosystem of claim 33 further comprising the multiplicative group with prime order

| BB5DFE42 DE115C00 DB5EF1B0 388344D6 C15485AD | and generator

| 5D9E9D4C | 6EF57E63 | 67659293 | 45D2FA1F | 40D84922 | 37BA8BDA | 1E3A3FBC | 6FCB118F |
|---|---|---|---|---|---|---|---|
| 991EA62B | 256BAB43 | 8BE5F2CE | 979466A6 | EDD266BA | 1AD0B9D7 | B97E5565 | 25A00A76. |

37. A cryptosystem, comprising
means to input a cryptovariable;
means to multiply said cryptovariable to form a product;
modulus means;
means to reduce the product with respect to said modulus means; and
said modulus means having an input port for setting the modulus equal to the prime

| 93E8965D | AFD9DFEC | FD00B466 | B68F90EA | 68AF5DC9 | FED91527 | 8D1B3A13 | 7471E655 |
|---|---|---|---|---|---|---|---|
| 96C37FED | 0C7829FF | 8F8331F8 | 1A270043 | 8ECDCC09 | 447DC397 | C685F397 | 294F722B |
| CC484AED | F28BED25 | AAAB35D3 | 5A65DB1F | D62C9D7B | A55844FE | B1F9401E | 67134093 |
| 3EE43C54 | E4DC4594 | 00D7AD61 | 248B83A2 | 624835B3 | 1FFF2D95 | 95A5B90B | 276E44F9. |

38. The cryptosystem of claim 37 wherein said cryptosystem is based on the discrete logarithm problem.

39. The cryptosystem of claim 37 wherein said cryptosystem is based on elliptic curves.

40. The cryptosystem of claim 37 further comprising the multiplicative group with prime order

| BB5DFE42 DE115C00 DB5EF1B0 388344D6 C15485AD | and generator

| 69279F8E | BAB80E8F | 24F01846 | 2196636C | 4C225464 | F0133E0F | 2F21E7BB | ED1D853F |
|---|---|---|---|---|---|---|---|
| 06EB949A | 86850A30 | A9B5B2CE | A830EAAD | 00E7BDF6 | 1EBC81CC | 41DEBAFF | 1B5BFD9F |
| 2AA4B113 | 29B13C3D | C6951127 | FBC86B4D | 3533823B | F97A58DE | 2FF1F9C9 | B3177BA3 |
| 494ED5E0 | 00383DBD | 6A699D57 | 89548FCE | F507368E | 4BE66EEB | 0F087573 | 8CBCFCC5. |

41. In a modulus-based cryptosystem, a system for representing residue classes comprising
a modulus;
a bound greater than said modulus, not necessarily explicit;
a nonassociative semigroup operation on nonnegative integers less than said bound; and
a nonassociative semigroup operation compatible with modular multiplication.

42. The system of claim 41 wherein said bound is chosen depending on said modulus to guarantee quotient and residue spill words are zero in said nonassociative semigroup operation.

43. The system of claim 41 wherein said bound is a power of two.

44. The system of claim 41 further comprising means to extract modular exponentials of cryptovariables with respect to said modulus.

45. The system of claim 41 further comprising means to change said modulus.

46. In a cryptosystem, a method for constructing a nonassociative semigroup comprising
inputting a modulus;
proving existence of a bound greater than said modulus;
operating on integers less than said bound by multiplication followed by partial modular reduction;
generating said nonassociative semigroup with integers less than said modulus.

47. The method of claim 46 further comprising calculating a modular exponential by first calculating in said nonassociative semigroup and then fully reducing the result.

48. The method of claim 46 further comprising generating public key messages.

* * * * *